US00RE45031E

(19) United States
(12) Reissued Patent
Park et al.

(10) Patent Number: US RE45,031 E
(45) Date of Reissued Patent: Jul. 22, 2014

(54) VISION-BASED AUGMENTED REALITY SYSTEM USING INVISIBLE MARKER

(75) Inventors: Jong-Il Park, Seoul (KR); Han-Hoon Park, Kyungsangnam-do (KR)

(73) Assignee: Industry-University Cooperation Foundation Hanyang University, Seoul (KR)

(21) Appl. No.: 13/602,057

(22) Filed: Aug. 31, 2012

Related U.S. Patent Documents

Reissue of:
(64) Patent No.: 7,808,524
Issued: Oct. 5, 2010
Appl. No.: 11/658,719
PCT Filed: Apr. 7, 2005
PCT No.: PCT/KR2005/000991
§ 371 (c)(1),
(2), (4) Date: Jan. 29, 2007
PCT Pub. No.: WO2006/011706
PCT Pub. Date: Feb. 2, 2006

(30) Foreign Application Priority Data

Jul. 30, 2004 (KR) ..... 10-2004-0060388

(51) Int. Cl.
*H04N 5/30* (2006.01)
*G09G 5/00* (2006.01)

(52) U.S. Cl.
USPC ..... 348/162

(58) Field of Classification Search
None
See application file for complete search history.

(56) References Cited

U.S. PATENT DOCUMENTS 4,608,599 A * 8/1986 Kaneko et al. ..... 348/164
5,696,892 A 12/1997 Redmann et al.
5,742,263 A 4/1998 Wang et al.
6,433,760 B1 * 8/2002 Vaissie et al. ..... 345/8
7,162,054 B2 * 1/2007 Meisner et al. ..... 382/103
2002/0163499 A1 11/2002 Sauer
2003/0179308 A1 * 9/2003 Zamorano et al. ..... 348/333.12
2003/0227542 A1 * 12/2003 Zhang et al. ..... 348/61
2004/0113885 A1 * 6/2004 Genc et al. ..... 345/156
2004/0119716 A1 6/2004 Park et al.
2005/0285038 A1 * 12/2005 Frangioni ..... 250/330

FOREIGN PATENT DOCUMENTS

JP 9062839 A 3/1997
JP 2000102036 A 4/2000
JP 2000261789 A 9/2000
JP 2002090118 A 3/2002
JP 2003036434 A 2/2003

OTHER PUBLICATIONS

Thalmann, Nadia Magnenat et al., "Animating Virtual Actors in Real Environments", *ACM Multimedia Systems*, Springer, vol. 5, No. 2, 1997, pp. 113-125 (17 pp.).

* cited by examiner

*Primary Examiner* — Lin Ye
*Assistant Examiner* — Euel Cowan
(74) *Attorney, Agent, or Firm* — AlbertDhand LLP

(57) ABSTRACT

A vision-based augmented reality system using an invisible marker indicates an invisible marker on a target object to be tracked, such that it can rapidly and correctly track the target object by detecting the invisible marker. The augmented reality system includes a target object including an infrared marker drawn by an invisible infrared light-emitting material; a visible-ray camera for capturing an image of the TO; an infrared-ray camera for capturing an image of the IM included in the TO image; an optical axis converter for allowing the infrared-ray camera and the visible-ray camera to have the same viewing point; an image processing system for rendering a prepared virtual image to the TO image to generate a new image.

13 Claims, 5 Drawing Sheets

VISION-BASED AUGMENTED REALITY SYSTEM USING INVISIBLE MARKER

Matter enclosed in heavy brackets [ ] appears in the original patent but forms no part of this reissue specification; matter printed in italics indicates the additions made by reissue.

TECHNICAL FIELD

The present invention relates to an augmented reality system for real-time matching a virtual computer graphic (CG) image with a real image, and more particularly to a vision-based augmented reality system using an invisible marker, which indicates an invisible marker on a target object to be tracked, and rapidly and correctly tracks the target object by detecting the invisible marker, such that it rapidly implements correct augmented reality, obviates problems generated when a visible marker is used, and is applicable to a variety of application fields.

BACKGROUND ART

Generally, three virtual realities, i.e., an immersive virtual reality (VR), a desktop VR, and an augmented reality, have been widely used. The augmented reality is indicative of a user interface technique capable of correctly matching a virtual image generated by a computer with a real image viewed by a user. The above-mentioned augmented reality can provide a user with a higher reality and higher recognition accuracy.

In order to implement the above-mentioned augmented reality, a method for correctly estimating the movement of a camera or a target object is of importance. A method for implementing the above-mentioned augmented reality generally includes the following first and second methods.

The first method uses characteristics collected by objects existing in the real world, and is considered to be an ultimate purpose of the augmented reality field. However, if the number of characteristics collected by objects is a small number or an environment condition such as an illumination condition is unstable, performance is greatly deteriorated.

The second method uses known markers, and is more stable than the above-mentioned first method. In this case, it is indicative of an object artificially inserted in the real world to correctly estimate the movement of a camera or a target object, such that it may hide other objects or may be unpleasant to the eye. Due to the above-mentioned problems, the augmented reality technologies using the known marker have limited application.

The vision-based augmented reality system will hereinafter be described with reference to FIG. 1.

FIG. 1 is a conventional vision-based augmented reality system.

Referring to FIG. 1, the conventional vision-based augmented reality system includes a camera 11 for capturing a target object (TO) on which a visible marker (VM) is indicated; an image processor 12 for monitoring a position and attitude of the marker upon receiving a mark image indicated on the TO from the camera 11, tracking a position and pose of the TO, and rendering a virtual image to a TO image such that it generates a new image; and an output unit 13 for displaying the image received from the image processor 12 on a screen.

The above-mentioned augmented reality system uses the visible marker so that it correctly and rapidly implements the augmented reality. In this case, the marker is an artificial addition not present in the real world, such that the above-mentioned augmented reality system has a disadvantage in that the marker hides a desired target object or is unpleasant to the eye. Also, the number of application fields of the above-mentioned augmented reality system using the visible marker is very limited.

Therefore, the present invention has been made in view of the above problems, and it is an object of the present invention to provide a vision-based augmented reality system using an invisible marker, which indicates an invisible marker on a target object to be tracked, and rapidly and correctly tracks the target object by detecting the invisible marker, such that it rapidly implements correct augmented reality, obviates problems generated when a visible marker is used, and is applicable to a variety of application fields.

SUMMARY OF THE INVENTION

In accordance with the present invention, the above and other objects can be accomplished by the provision of a vision-based augmented reality system using an invisible marker, comprising: a target object (TO) including an infrared marker (IM) drawn by an invisible infrared light-emitting material; a visible-ray camera for capturing an image of the TO; an infrared-ray camera for capturing an image of the IM included in the TO image; an optical axis converter for transmitting a visible ray received from the TO to the visible-ray camera, transmitting an infrared ray received from the TO to the infrared-ray camera, and allowing the infrared-ray camera and the visible-ray camera to have the same viewing point; an image processing system for receiving the infrared marker image from the infrared-ray camera, receiving the TO image from the visible-ray camera, separating the infrared marker image and the TO image from each other, real-time monitoring a position and pose of the IM associated with the infrared-ray camera, real-time tracking a position and pose of the TO, rendering a prepared virtual image to the TO image, and generating a new image; and an output unit for displaying the image received from the image processing system on a screen.

The above-mentioned vision-based augmented reality system using the invisible marker indicates an invisible marker on a target object to be tracked, and rapidly and correctly tracks the target object by detecting the invisible marker. Therefore, the vision-based augmented reality system rapidly implements correct augmented reality, obviates problems generated when a visible marker is used, and is applicable to a variety of application fields.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
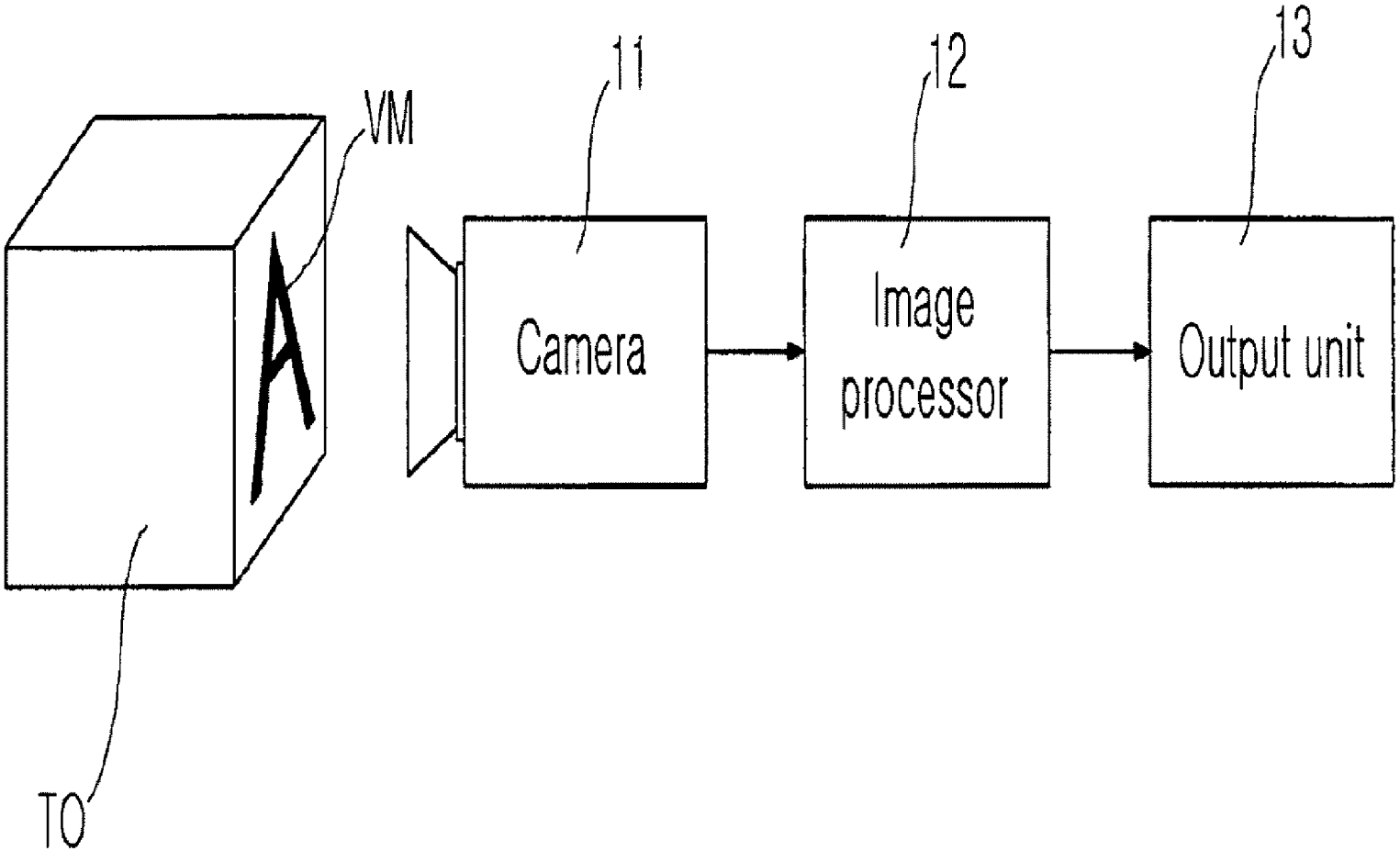
FIG. 1 is a block diagram illustrating a conventional vision-based augmented reality system.
Figure 2:
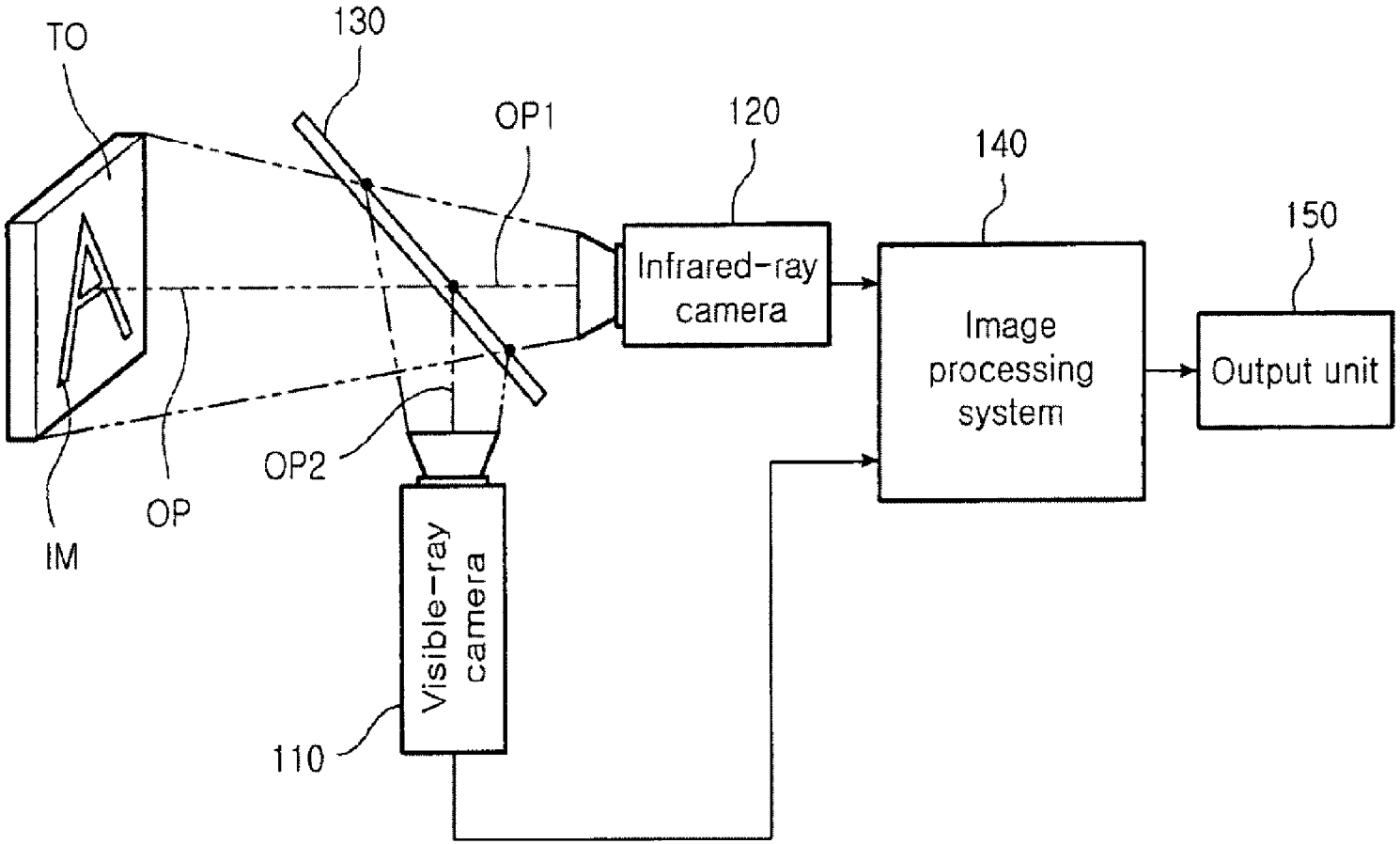
FIG. 2 is a block diagram illustrating a vision-based augmented reality system according to the present invention.

FIG. 2 is a block diagram illustrating a vision-based augmented reality system according to the present invention.

Referring to FIG. 2, the vision-based augmented reality system according to the present invention includes a Target Object (TO) to be tracked, a visible-ray camera 110, an infrared-ray camera 120, an optical axis converter, an image processing system 140, and an output unit 150.

The TO includes an infrared marker (IM) designated by an invisible infrared light-emitting material. The IM is adopted to correctly track the TO. Also, an invisible infrared mark is adopted not to intrude upon the user's view. In this case, infrared light-emitting ink may be used as the infrared light-emitting material.

The visible-ray camera 110 captures an image of the TO. In order to augment the degree of separation between a visible ray and an infrared ray, the visible-ray camera 110 may include a color compensation filter for passing visible-ray light.

The infrared-ray camera 120 captures an image of an infrared marker (IM) included in the TO. In order to augment the degree of separation between the infrared ray and the visible ray, the infrared-ray camera 120 may include an infrared pass filter for passing infrared-ray light.

In the case of using the color compensation filter and the infrared pass filter, the visible-ray beam and the infrared-ray light can be separated from each other, such that the degree of separation between the infrared ray and the visible ray can be increased.

The optical axis converter transmits a visible ray received from the TO to the visible-ray camera 110, and transmits an infrared ray received from the TO to the infrared-ray camera 120, such that a viewing point of the infrared-ray camera 120 is equal to that of the visible-ray camera 110.

In this case, the above-mentioned condition where the infrared-ray camera 120 and the visible-ray camera 110 have the same viewing point means that the infrared-ray camera 120 and the visible-ray camera 110 capture the same scene in the same direction at the same location.

The viewing point of the infrared-ray camera 120 is equal to that of the visible-ray camera 110 by means of the above-mentioned optical axis converter, such that the infrared-ray camera 120 and the visible-ray camera 110 can capture the same scene at the same distance and viewing point.

The image processing system 140 receives an infrared marker image from the infrared-ray camera 120, receives the TO image from the visible-ray camera 110, separates the infrared marker image and the TO image from each other, real-time monitors the position and pose of the infrared marker (IM) associated with the infrared-ray camera 120, real-time tracks the position and pose of the TO, and renders a prepared virtual image to the TO image, such that it generates a new image.

In this case, the rendering means that a three-dimensional CG color or effect is applied to individual planes of a real object drawn on a screen, resulting in an increased reality of the real object displayed on a screen.

The output unit 150 displays the image received from the image processing system 140 on a screen. For example, a general monitor, a Head Mounted Display (HMD), stereoscopic glasses such as CrystalEyes, and an optical see-through HMD, etc., may be used as the output unit 150.

In the meantime, the optical axis converter is adapted to allow the viewing point of the infrared-ray camera 120 to coincide with that of the visible-ray camera 110, and can be implemented with a cold mirror 130 or a prism 130A.

Referring to FIG. 2, if the optical axis converter is implemented with a cold mirror, it is arranged between the visible-ray camera 110 and the infrared-ray camera 120, transmits the infrared ray generated from the TO to the infrared-ray camera 120, reflects the visible ray generated from the TO on the visible-ray camera 110, and thereby allows the viewing point of the infrared-ray camera 120 to coincide with that of the visible-ray camera 110.

Figure 3:
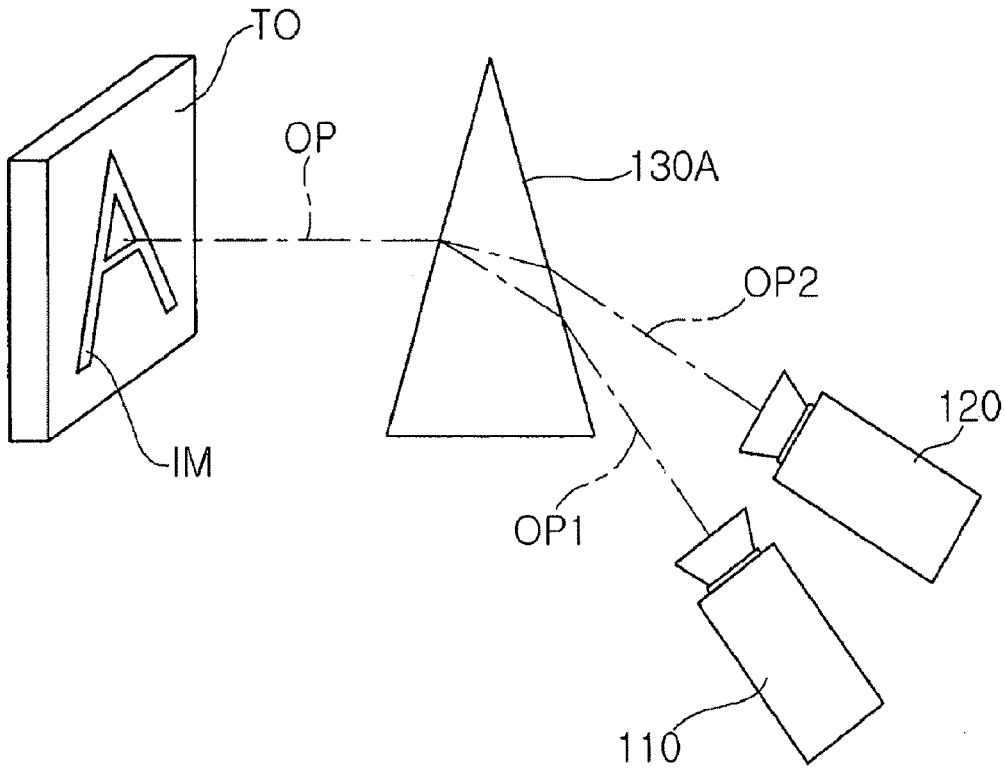
FIG. 3 is a conceptual diagram illustrating a method for employing a prism acting as an optical axis converter according to the present invention.

FIG. 3 is a conceptual diagram illustrating a method for employing a prism acting as an optical axis converter according to the present invention.

Referring to FIG. 3, if the optical axis converter is implemented with a prism 130A, it refracts a visible ray generated from the TO in the direction of the visible-ray camera 110, and refracts an infrared ray generated from the TO in the direction of the infrared-ray camera 120, such that the viewing point of the infrared-ray camera 120 coincides with that of the visible-ray camera 110.

Operations and effects of the present invention will hereinafter be described with reference to the annexed drawings.

Figure 4:
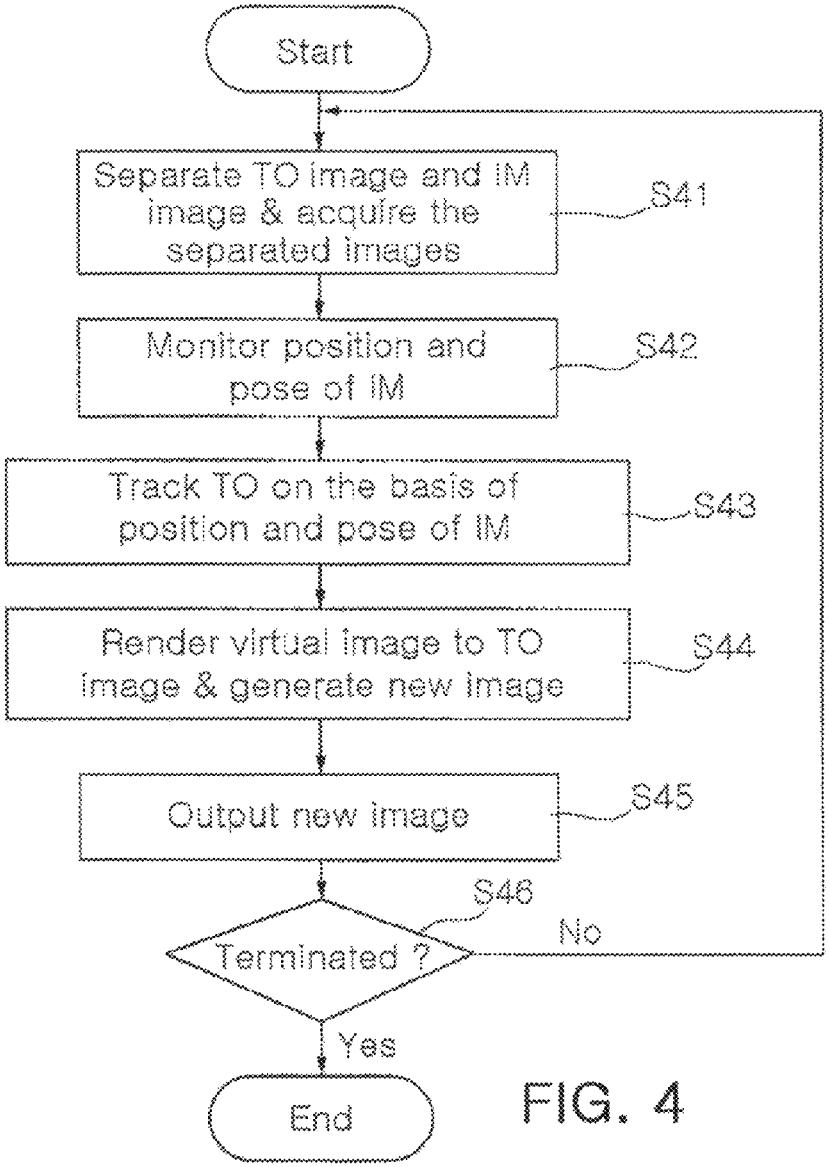
FIG. 4 is a flow chart illustrating an image processing system according to the present invention.

FIG. 4 is a flow chart illustrating an image processing system according to the present invention. Referring to FIGS. 2-3, the optical axis converter transmits a visible ray (OP1) from among a plurality of OPs received from the TO to the visible-ray camera 110, and transmits an infrared ray (OP2) from among a plurality of OPs received from the TO to the infrared-ray camera 120, such that the viewing point of the infrared-ray camera 120 is equal to that of the visible-ray camera 110. By the use of above-mentioned optical axis converter, the infrared-ray camera 120 and the visible-ray camera 110 can capture the same scene at the same distance and viewing point.

In this case, the visible-ray camera 110 captures an image of the TO including the IM drawn by an infrared light-emitting material, and outputs the captured TO image to the image processing system 140. The infrared-ray camera 120 captures an image of the IM included in the TO, and outputs the captured IM image to the image processing system 140.

Figures 5A, 5B:
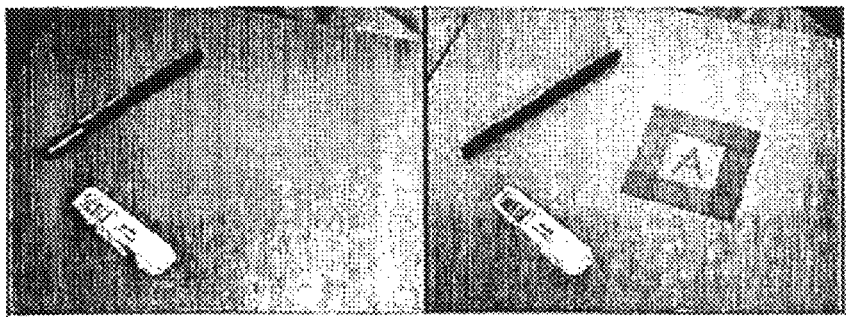
FIGS. 5a and 5b are exemplary images captured by a visible-ray camera or an infrared camera according to the present invention.

FIG. 5a is an exemplary image captured by the visible-ray camera, and FIG. 5b is an exemplary image captured by the infrared-ray camera.

FIGS. 5a~5b are images captured by the visible-ray camera and the infrared-ray camera at the same time point, respectively. In more detail, FIG. 5a is an image captured by the visible-ray camera 110, and FIG. 5b is an image captured by the infrared-ray camera 120. As shown in FIG. 5b, the IM denoted by "A" can be captured by the infrared-ray camera 120.

Referring to FIGS. 2 and 4, the image processing system 140 acquires the TO image from the visible-ray camera 110, acquires the IM image from the infrared-ray camera 120 at step S41. The image processing system 140 compares coordinates of the acquired IM image with those of a prepared reference marker, such that it can real-time calculate the position and pose of the IM at step S42.

The image processing system 140 monitors the position and pose of the IM, such that it can real-time track the position and pose of the TO at step S43. The image processing system renders a prepared virtual image to the TO image to generate a new image at step S44, outputs the new image at step S45, and repeats an output control procedure of the output unit 150 until the entire program is terminated at step S46.

Therefore, the image is transmitted from the image processing system 140 to the output unit 150, resulting in augmented reality implementation.

Figure 6:
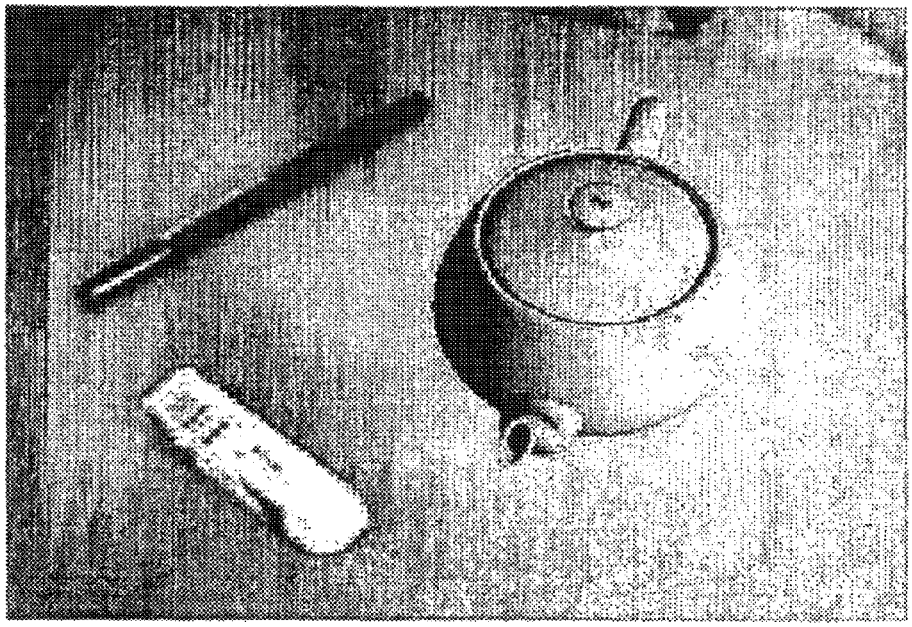
FIG. 6 is an implementation example of the augmented reality according to the present invention.

FIG. 6 is an implementation example of the augmented reality according to the present invention.

Referring to FIG. 6, the position of the IM is tracked by the infrared-ray camera 120 such that the pose of the TO is calculated. A prepared kettle image is rendered to the image captured by the visible-ray camera 110, such that a new image in which the augmented Reality (AR) is implemented is shown in FIG. 6.

As apparent from the above description, the present invention can correctly and rapidly track a TO using a marker made of invisible ink (i.e., an infrared light-emitting material), such that it can correctly and rapidly implement the augmented reality. In more detail, the present invention monitors the marker using the infrared-ray camera, and renders a virtual image to an image captured by the visible-ray camera using the monitored result, resulting in augmented reality implementation. The viewing points of the visible-ray and infrared-ray cameras coincide with each other by a cold mirror or a prism, such that the same augmented reality can be implemented by monitoring an invisible marker on the assumption that only the visible-ray image is considered.

In conclusion, the present invention is applicable to all application fields requiring the augmented reality technology.

In the augmented reality system for real-time matching a virtual CG image with a real image, a vision-based augmented reality system using an invisible marker indicates an invisible marker on a target object to be tracked, and rapidly and correctly tracks the target object by detecting the invisible marker, such that it rapidly implements correct augmented reality, obviates problems generated when a visible marker is used, and is applicable to a variety of application fields.

The invention claimed is:

[1. A vision-based augmented reality system using an invisible marker, comprising:

a target object (TO) including an infrared marker (IM) drawn by an invisible infrared light-emitting material;

a visible-ray camera for capturing an image of the TO;

an infrared-ray camera for capturing an image of the IM included in the TO image;

an optical axis converter for transmitting a visible ray received from the TO to the visible-ray camera, transmitting an infrared ray received from the TO to the infrared-ray camera, and allowing the infrared-ray camera and the visible-ray camera to have the same viewing point;

an image processing system for receiving the infrared marker image from the infrared-ray camera, receiving the TO image from the visible-ray camera, separating the infrared marker image and the TO image from each other, real-time monitoring a position and pose of the IM associated with the infrared-ray camera, real-time tracking a position and pose of the TO, and rendering a prepared virtual image to the TO image based on the tracked position and pose of the TO to generate a new image; and an output unit for displaying the image received from the image processing system on a screen.]

[2. The system according to claim 1, wherein the visible-ray camera includes a color compensation filter for passing visible-ray light.]

[3. The system according to claim 1, wherein the infrared-ray camera includes an infrared pass filter for passing infrared-ray light to recognize the IM.]

[4. The system according to claim 1, wherein the optical axis converter is indicative of a cold mirror, which is arranged between the visible-ray camera and the infrared-ray camera, transmits the infrared ray generated from the TO to the infrared-ray camera, reflects the visible ray generated from the TO on the visible-ray camera, and allows the viewing point of the infrared-ray camera to coincide with that of the visible-ray camera.]

[5. The system according to claim 1, wherein the optical axis converter is indicative of a prism, which refracts the visible ray received from the TO in the direction of the visible-ray camera, refracts the infrared ray received from the TO in the direction of the infrared-ray camera, and allows the viewing point of the infrared-ray camera to coincide with that of the visible-ray camera.]

*6. A vision-based augmented reality system using an invisible marker, comprising:*

*a visible-ray camera for capturing target object (TO) including an infrared marker (IM) drawn by an invisible infrared light-emitting material;*

*an infrared-ray camera for capturing the IM included in the TO; and*

*an image processing system for receiving an image of the infrared marker from the infrared-ray camera, receiving an image of the TO from the visible-ray camera, separating the image of the infrared marker and the image of the TO from each other, monitoring position and pose of the IM associated with the infrared-ray camera, tracking position and pose of the TO based on position and pose of the IM, and rendering a virtual image to the TO image.*

*7. The system of claim 6, further comprising an optical axis converter for changing viewing point of at least one of the visible-ray camera and the infrared-ray camera.*

*8. The system of claim 7, wherein the optical axis converter changes the viewing point of at least one of the visible-ray camera and the infrared-ray camera so that the infrared-ray camera and the visible-ray camera have the same viewing point.*

*9. The system of claim 8, wherein the optical axis converter includes a cold mirror, which transmits infrared ray generated from the TO on the infrared-ray camera, and reflects visible-ray generated from the TO to the visible-ray camera.*

*10. The system of claim 12, further comprising an output unit for displaying the rendered virtual image.*

*11. The system of claim 10, wherein the output unit includes at least one of a head mount display, a 3-dimensional glass and a glass-type HMD.*

*12. A vision-based augmented reality system using an invisible marker, comprising:*

*an infrared-ray camera for capturing a target object (TO) having an infrared marker drawn by an invisible infrared light-emitting material;*

*a visible-ray camera for capturing the TO; and*

*an image processing system for monitoring position and pose of the IM from an image of the infrared-ray camera, tracking position and pose of the TO based on the position and the pose of the IM, rendering a virtual image based on the tracked position and pose,*

*wherein the image processing system separates an image of the visible-ray camera and an image of the infrared-ray camera from each other in receiving the image of the visible-ray camera and the image of the infrared-ray camera, and renders the virtual image on an image captured by the visible-ray camera.*

*13. The system of claim 12, further comprising an optical axis converter for changing viewing point of at least one of the visible-ray camera and the infrared-ray camera.*

*14. The system of claim 13, wherein the optical axis converter changes the viewing point of at least one of the visible-ray camera and the infrared-ray camera so that the infrared-ray camera and the visible-ray camera have the same viewing point.*

*15. The system of claim 17, wherein the optical axis converter changes the viewing point of at least one of the visible-ray camera and the infrared-ray camera so that the infrared-ray camera and the visible-ray camera have the same viewing point.*

*16. The system of claim 17, wherein the optical axis converter includes a cold mirror, which transmits infrared ray generated from the TO on the infrared-ray camera, and reflects visible-ray generated from the TO to the visible-ray camera.*

*17. A vision-based augmented reality system using an invisible marker, comprising:*

*a visible-ray camera for capturing a target object (TO) including an infrared marker (IM) drawn by an invisible infrared light-emitting material;*

*an infrared-ray camera for capturing the IM included in the TO;*

*an optical axis converter for changing viewing point of at least one of the visible-ray camera and the infrared-ray camera; and*

*an image processing system for rendering a virtual image using an image captured by the infrared-ray camera, an image captured by the visible-ray camera and IM;*

*wherein the image processing system receives an image of the infrared marker from the infrared-ray camera, receives an image of the TO from the visible-ray camera, separates the image of the infrared marker and the image of the TO from each other, monitors position and pose of the IM associated with the infrared-ray camera, tracks position and pose of the TO based on position and pose of the IM, and renders the virtual image to the TO image.*

*18. A display device, comprising:*

*an infrared-ray camera for capturing a target object (TO) having an infrared marker drawn by an invisible infrared light-emitting material;*

*a visible-ray camera for capturing the TO;*

*an image processing system for monitoring position and pose of the IM from an image of the infrared-ray camera, tracking position and pose of the TO based on the position and the pose of the IM, rendering a virtual image based on the tracked position and pose, and*

*an output unit for displaying the rendered virtual image;*

*wherein the image processing system separates an image of the visible-ray camera and an image of the infrared-ray camera from each other in receiving the image of the visible-ray camera and the image of the infrared-ray camera, and renders the virtual image on an image captured by the visible-ray camera.*

* * * * *